(12) United States Patent
Singh

(10) Patent No.: US 7,549,412 B2
(45) Date of Patent: Jun. 23, 2009

(54) SYSTEM AND METHOD FOR RECOVERING WASTED ENERGY FROM AN INTERNAL COMBUSTION ENGINE

(76) Inventor: Satnarine Singh, #2 Sunset Ridge, La Romain (TT)

( * ) Notice: Subject to any disclaimer, the term of this patent is extended or adjusted under 35 U.S.C. 154(b) by 237 days.

(21) Appl. No.: 11/353,665

(22) Filed: Feb. 13, 2006

(65) Prior Publication Data

US 2006/0124079 A1    Jun. 15, 2006

Related U.S. Application Data

(63) Continuation-in-part of application No. 10/453,238, filed on Jun. 3, 2003, now Pat. No. 7,021,272, which is a continuation-in-part of application No. 10/007,012, filed on Nov. 5, 2001, now Pat. No. 6,571,749, which is a continuation-in-part of application No. 09/465,329, filed on Dec. 17, 1999, now Pat. No. 6,311,651.

(51) Int. Cl.
*F02G 5/00* (2006.01)

(52) U.S. Cl. ...................... 123/543; 123/556

(58) Field of Classification Search ................ 123/543, 123/545, 556, 568.12, 559.1; 60/598, 599, 60/604, 605.1, 607, 620, 622
See application file for complete search history.

(56) References Cited

U.S. PATENT DOCUMENTS

| | | | |
|---|---|---|---|
| 1,339,176 A | | 5/1920 | Dyer |
| 1,501,392 A | | 7/1924 | Burtnett et al. |
| 2,671,311 A | | 3/1954 | Rohrbach |
| 3,797,562 A | * | 3/1974 | Brille et al. ................. 165/279 |
| 3,930,476 A | * | 1/1976 | Koch .......................... 123/545 |
| 3,964,263 A | | 6/1976 | Tibbs |
| 4,022,164 A | | 5/1977 | Fuchs |
| 4,143,518 A | | 3/1979 | Kellogg-Smith |
| 4,167,165 A | * | 9/1979 | Finlay et al. ................. 123/545 |
| 4,210,103 A | * | 7/1980 | Dimitroff et al. ............ 123/1 A |
| 4,237,689 A | * | 12/1980 | Sampietro .................... 60/599 |
| 4,423,709 A | | 1/1984 | Arrieta |

(Continued)

OTHER PUBLICATIONS

BMW unveils the turbosteamer concept; http://www.gizmag.co.uk/go/4936/; Printed on Dec. 23, 2005, pp. 1 of 4 , 2 of 4.

(Continued)

*Primary Examiner*—Hai H Huynh
(74) *Attorney, Agent, or Firm*—Malloy & Malloy, P.A.

(57) ABSTRACT

An internal combustion engine and its method of operation including at least one embodiment operating on a six-stroke cycle and including at least one piston and cylinder assembly. The six-stroke cycle includes two power strokes, the latter of which is the result of a water to steam conversion process utilizing the heat of the exhaust gas from the first power stroke. A second embodiment comprises a hybrid power generating assembly incorporating alternative, first and second power sources respectively comprising an internal combustion engine and a water injection engine, the latter of which operates on the water to steam conversion process, wherein the required heat therefore is derived from the exhaust gas of the internal combustion engine. Another preferred embodiment comprises the utilization of different normally wasted heat sources from an IC engine for the generation of sufficient work energy to drive a power take-off, such as hybrid drive assembly.

26 Claims, 6 Drawing Sheets

U.S. PATENT DOCUMENTS

| | | | |
|---|---|---|---|
| 4,588,040 A | | 5/1986 | Albright, Jr. et al. |
| 4,718,393 A | * | 1/1988 | Bakish ................. 123/593 |
| 4,736,715 A | | 4/1988 | Larsen |
| 4,890,595 A | * | 1/1990 | Fischer ................ 123/556 |
| 4,976,226 A | | 12/1990 | Herman |
| 5,101,801 A | * | 4/1992 | Schatz ................. 123/556 |
| 5,606,946 A | | 3/1997 | Data et al. |
| 5,740,786 A | * | 4/1998 | Gartner .............. 123/568.12 |
| 5,996,560 A | * | 12/1999 | Schechter ............. 123/556 |
| 6,095,100 A | | 8/2000 | Hughes |
| 6,112,705 A | | 9/2000 | Nakayama et al. |
| 6,119,457 A | * | 9/2000 | Kawamura ............ 60/618 |
| 6,138,649 A | * | 10/2000 | Khair et al. ......... 123/568.12 |
| 6,202,402 B1 | * | 3/2001 | Sattelmayer .......... 60/39.511 |
| 6,295,973 B1 | * | 10/2001 | Yang ................. 123/543 |
| 6,311,651 B1 | * | 11/2001 | Singh ................. 123/25 C |
| 6,442,455 B1 | | 8/2002 | Kotre et al. |
| 6,571,749 B2 | * | 6/2003 | Singh ................. 123/25 C |
| 6,786,210 B2 | * | 9/2004 | Kennedy et al. ....... 123/568.12 |
| 6,883,325 B2 | * | 4/2005 | Chomiak ................ 60/618 |
| 7,011,080 B2 | * | 3/2006 | Kennedy .............. 123/568.12 |
| 7,017,357 B2 | * | 3/2006 | Brasz .................. 62/115 |
| 7,021,272 B2 | * | 4/2006 | Singh ................. 123/198 F |
| 7,059,130 B2 | * | 6/2006 | Kawamura ............ 60/618 |
| 7,152,407 B2 | * | 12/2006 | Jobson ................ 60/604 |
| 2006/0213184 A1 | * | 9/2006 | Stewart ............... 60/278 |
| 2007/0039321 A1 | * | 2/2007 | Sheidler et al. ......... 60/599 |
| 2007/0039322 A1 | * | 2/2007 | Bering et al. .......... 60/599 |

OTHER PUBLICATIONS

Figure;http://www.gizmag.co.uk/watermark.php?p=4936_14120572326.jpg, Printed Dec. 23, 2005, p. 1 of 1.

* cited by examiner

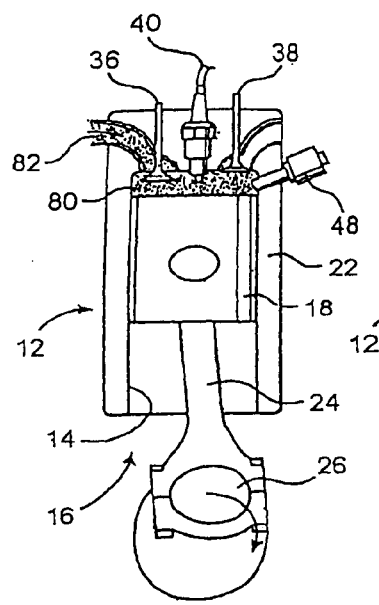
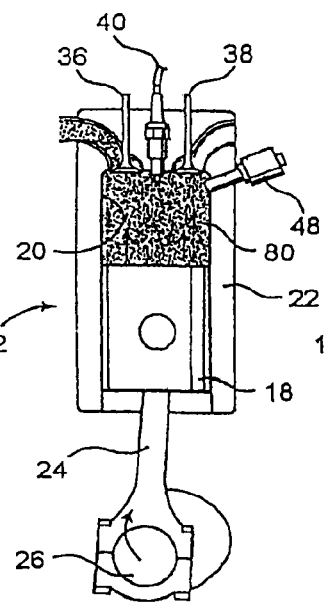
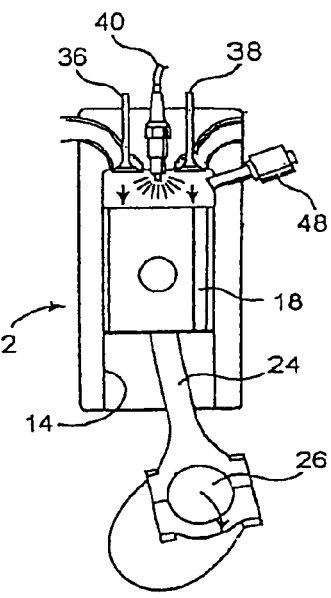
FIG. 2A     FIG. 2B     FIG. 2C
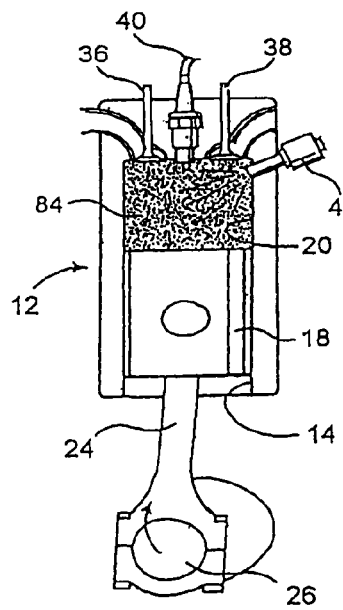
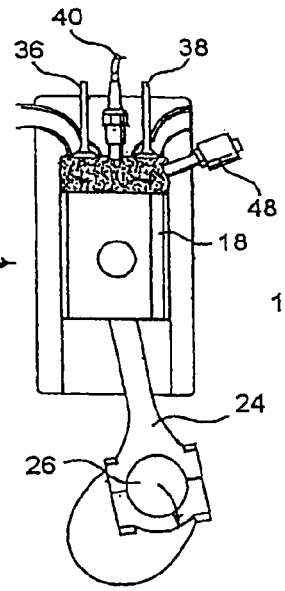
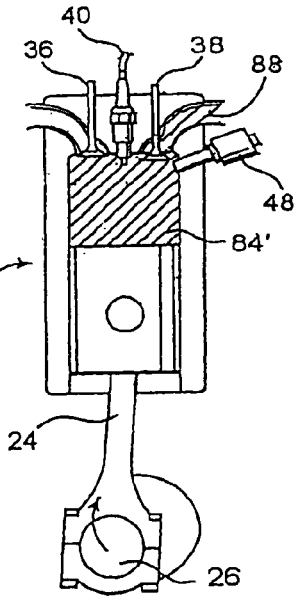
FIG. 2D     FIG. 2E     FIG. 2F

SYSTEM AND METHOD FOR RECOVERING WASTED ENERGY FROM AN INTERNAL COMBUSTION ENGINE

CLAIM OF PRIORITY

The present application is a continuation-in-part application of previously filed, currently pending application having Ser. No. 10/453,238 filed on Jun. 3, 2003 now U.S. Pat. No. 7,021,272, which is a continuation-in-part application of previously filed application having Ser. No. 10/007,012 filed on Nov. 5, 2001, which matured into U.S. Pat. No. 6,571,749 on Jun. 3, 2003, which is a continuation-in-part application of previously filed application having Ser. No. 09/465,329, filed on Dec. 17, 1999 which matured into U.S. Pat. No. 6,311,651 on Nov. 6, 2001, wherein all of the above are incorporated herein in their entirety by reference.

BACKGROUND OF THE INVENTION

1. Field of the Invention

At least one preferred embodiment of this invention relates to a computer controlled, internal combustion engine designed to operate on a six-stroke cycle, wherein water is injected into each of the one or more cylinders during a predetermined portion of the six-stroke cycle depending upon the energy content within the cylinder subsequent to ignition of the conventional air-fuel mixture. The residual heat from the ignited air-fuel mixture serves to convert the injected water into steam on a controlled basis, thereby creating an auxiliary power stroke. Additional embodiments also comprise structural and operational modifications for the recovery of wasted energy from the IC engine.

2. Description of the Related Art

It is well known that for over a hundred years the internal combustion (IC) engine was and is the dominating source of power for motorized vehicles. Other than rotary engines, the typical IC engine incorporates a plurality of piston and cylinder assemblies each of which includes a cylinder having a piston reciprocally mounted therein and wherein a combustible fluid, such as an air-fuel gaseous mixture, is forced into the interior of the cylinder, compressed and subsequently ignited. The ignition of the combustible fluid causes a significant expansion of gases within the cylinder, resulting in the piston being forced downwardly within the cylinder and thereby, defining what is commonly known as a "power stroke". The piston is drivingly connected to a crank shaft which is drivingly connected to the remainder of the drive train associated with the motorized vehicle.

Over the years, numerous attempts have been made to increase the efficiency of IC engines, while at the same time protecting the environment by eliminating or significantly reducing the exhausting of pollutants into the surrounding atmosphere. Attempts to protect the environment have resulted in significant improvements in exhaust systems, fuel compositions and other operational components of modern IC engines, which sometimes derogatorily affect the efficiency or performance characteristics of such engines. Other attempts to improve the performance of IC engines, without harming the environment, have the included the design of an IC engine which operates on a six-stroke cycle. In such designs, the first four strokes function as a conventional internal combustion engine and include an intake stroke, compression stroke, power stroke and exhaust stroke. The last two strokes of the six-stroke cycle include the injection of water into the combustion chamber for purposes of converting the water to steam by using the residual heat remaining therein. The expansion of the steam is intended to provide an additional power stroke, without additional fuel or combustible fluid being supplied. However, for the most part, such known attempts have failed to provide an internal combustion engine capable of operating on a six-stroke cycle, which is sufficiently efficient and effective for wide spread commercial use.

In order to understand the problems associated with the effective development of an IC engine of the type set forth above, it is important to understand the relationship between water, steam, temperature and pressure, all of which are governed by the laws of thermodynamics, and more specifically, by what are commonly referred to as the "Steam Tables". Based on these laws, it is well recognized that in a closed container or system, for example, heated water will be maintained in a liquid state at a temperature of 297 degrees Fahrenheit, only as long as the pressure is maintained at a minimum of 50 PSI. However, if the heated water were suddenly to be released from the closed container into atmosphere it would immediately "flash" into steam due to the significant drop in pressure. The reason for this instant conversion into steam is because the water has sufficient latent heat for the steam conversion and no longer has to absorb heat from an external source.

Prior attempts to take advantage of the force generated when the water converts to steam in the combustion chamber or cylinder an IC engine have, for the most part, failed due to the fact that the water was injected and allowed to convert or "flash" into steam at the wrong time during the six-stroke cycle. Allowing all of the water injected into a cylinder to simultaneously flash into steam would most probably result in damage to the engine due to the "instant" expansion force created. Rather than developing a power stroke in the engine, such an expansive force would have a tendency to crack the engine block or cause a failure in the seals between the piston and the interior surface of the cylinder. Accordingly, it is believed by the inventor hereof that in order to develop an efficient IC engine incorporating the conversion of injected water into steam, the conversion should be controlled and take place continuously or gradually over the duration of a specific predetermined portion of the six-stroke cycle, rather than instantaneously upon injection of the water into the cylinder.

The failure of previous attempts at water to steam conversion is further evidenced by an explanation of the ignition of a conventional air-fuel mixture in a conventional IC engine. More specifically, after the air-fuel mixture is compressed and ignited, the mixture burns and expands, thereby supplying a continuous force which drives the piston the length of the cylinder resulting in a "power stroke". This happens because the combustion of the air-fuel mixture occurs on a substantially continuous basis as the piston travels the length of the cylinder during the power stroke. All of the force or power resulting from the ignition of the air-fuel mixture is not released or exerted on the piston at one point in time. Therefore, it is believed by the inventor hereof that the control of the conversion of water into steam should similarly occur on a continuous rather than an instantaneous basis in order for such conversion to produce an effective and efficient additional power stroke in a six-stroke cycle.

Another characteristic common to known attempts to develop a six-stroke cycle IC engine is the premature exhausting of the conventional air-fuel mixture after it has been ignited. It is generally accepted that approximately 30% of the energy (heat) of the fuel charge is lost in the exhaust gases due to inherent designs of known or substantially conventional IC engines. However, if the exhaust gases can be maintained within the cylinder and properly mixed with a quantity of water being injected, the heat energy still remaining in the previously ignited fuel charge can be utilized to add another power stroke, occurring upon the conversion of water into steam within the cylinder.

Based on the above, there is a significant and recognized need for the development of an improved internal combustion engine which is capable of efficiently operating on a six-stroke cycle which includes the development of an additional power stroke through the injection of water into the cylinder or combustion chamber and the conversion of water into steam. The water to steam conversion should occur on a controlled basis and be at least partially dependent on the energy content within the cylinder, subsequent to ignition of a conventional air-fuel mixture and prior to the ignited air-fuel mixture being exhausted. Any such improved internal combustion engine should preferably have the injection of water and its conversion into steam controlled by a computer assembly or central processor, properly programmed in accordance with the related laws of thermodynamics and the conversion of water to steam in accordance with the "Steam Tables".

Moreover, recent attempts have been made, particularly in the motor vehicle industry to develop a vehicle capable of being operated by a power generating assembly incorporating alternative sources of power. Such vehicles and their associated engines or power generating assemblies are commonly known as hybrid vehicles or vehicles incorporating a "hybrid power-train". Commercially available vehicles incorporating hybrid power-trains include the Toyota™ Insight™ and the Honda™ Prius™. An operative advantage of these vehicles includes the fact that they are considered charge sustaining, gasoline/electric hybrids. This means that these vehicles do not require the recharging of the battery assembly associated therewith from a conventional, typically stationary, electrical power source. To the contrary both vehicles charge their individual battery assemblies from energy that would otherwise be wasted. However it is important to note that the charging facilities associated with the power-trains of these vehicles use gasoline as their sole external source of energy.

Further advantages of hybrid vehicles which incorporate electric technology are that the gasoline engine and the electric motor are each used for what they do best. More specifically, the gasoline engine is available for long range travel in that it uses gasoline as its high density power source. To the contrary, the electric motor allows for efficient capturing and reusing excess energy without requiring prolonged downtime for recharging at the aforementioned type of stationary recharging stations. The end result is a savings of gasoline utilized by hybrid vehicles of this type, thereby possibly providing a significant reduction in the consumption of fossil fuels, which of course is a major concern throughout the world.

Therefore, assuming that hybrid vehicles may become increasingly popular to the consuming public and as such proliferate, there is also a significant need for a hybrid vehicle providing even a greater operational efficiency and that capable of hybrid vehicles of the type set forth above. Moreover, there is a significant and long recognized need for a power generating assembly adaptable for use in motor vehicles which incorporates alternative sources of power. An improved power generating assembly of the type referred should be capable of accomplishing a recognizable increase in efficient operation at least partially through the use of a water to steam conversion process. In addition such a conversion process may best be controlled by a computer assembly or a central processor properly programmed in accordance with the related laws of thermodynamics. As such, an improved hybrid vehicle incorporating the principles as set forth above would utilize an internal combustion and an electric motor assembly connected in driving relation to the power takeoff of the vehicle. In addition, a second power source other than the internal combustion engine could be structured to directly power a source of electric energy incorporating both a generator and a battery assembly facility connected to and supplying electrical energy directly to the electric motor assembly.

In addition, variations of an improved hybrid vehicle incorporating an internal combustion engine and electric motor assembly or otherwise electrically powered drive train, could be more efficiently powered, at least in part, by the recovery of waste energy in the form of heat, conventionally and purposefully removed from the IC engine during its period of operation. Such an improved system and method for recovering wasted heat energy would overcome many of the disadvantages and problems in prior art attempts directed to the improvement in operating efficiency of a hybrid assembly as set forth above.

Previous attempts to make use of wasted energy, primarily in the form of heat, which is purposefully removed from the IC engine block by conventional cooling systems include water injection and a combination of water injection and hybrid technology such as described above and at least in part in U.S. Pat. No. 6,311,651 and U.S. Pat. No. 6,571,749 to the inventor herein. However, utilization of wasted heat energy through the recovery thereof can be additionally accomplished in a manner which significantly improves the efficiency and operating performance and which can be adapted to a variety of other systems intended and structured for the recovery of wasted energy from IC engines.

SUMMARY OF THE INVENTION

One or more preferred embodiments of the present invention are directed towards a computer controlled internal combustion (IC) engine, and its method of operation, designed to operate on a six-stroke cycle and specifically includes the injection of water into the combustion chamber or cylinder of each of a plurality of piston and cylinder assemblies, during a predetermined portion of the six-stroke cycle. More specifically, the quantity and timing of the water injection is controlled and regulated to the extent that the injected water is prevented from turning into steam even after reaching sufficiently high temperatures because of the continuously increasing pressure within the cylinder, due to the compression of gases therein, to the extent that the water is maintained in a liquid state until the beginning of an intended "auxiliary" power stroke.

More specifically, the IC engine of one or more preferred embodiments of the present invention comprises at least one, but preferably a plurality of piston and cylinder assemblies. Each such piston and cylinder assembly includes a cylinder which serves as a combustion chamber having a piston reciprocally mounted therein, and further including intake and exhaust valves associated therewith so as to regulate the flow of fluid into an out of the cylinder. A source of ignition is also connected to each chamber and may be in the form of a spark plug, glow plug or any other applicable and/or conventional means of igniting a combustible fluid, such as a gaseous mixture of fuel and air.

In addition to the above, the improved IC engine of the present invention includes an injection assembly comprising one or more injector structures associated with each of the cylinders and disposed and structured to inject predetermined quantities of water at predetermined rates and times into the individual cylinders under the control and regulation of a central processor. A central processor or computer of the general type referred to is known in the automobile and/or internal combustion engine industry for the control and regulation of a variety of operating conditions of the IC engine. The central processor of the related embodiments of the present invention is responsive to a plurality of sensors, all of which serve to define a sensor assembly, which sense and/or determine certain predetermined physical characteristics relating to the operation and performance of the engine.

As will be explained in greater detail hereinafter a variety of physical characteristics determined by the plurality of sensors may be used to determine the "energy content" within the cylinder during a predetermined portion of the six-stroke cycle. In turn, the energy content of a cylinder is used in determining the quantity and duration of water injection into the cylinder. Such physical characteristics may include, but are not limited to, the pressure and temperature of the interior of each cylinder at a first predetermined portion of the six-stroke cycle. The determination of the pressure and temperature may be used in the calculation of the energy content within the cylinder during a portion of the six-stroke cycle and is subject of U.S. Pat. Nos. 6,311,651 and 6,571,749 by the inventor hereof, which are incorporated herein, in their entirety, by reference.

In addition, one or more of the plurality of sensors are mounted on the engine to determine the engine speed as well as the temperature of the water being injected into the cylinder prior to its injection. The determination of the engine speed by the sensor assembly will, in turn, inform the central processor of the rate of travel of the pistons within respective ones of the cylinders. Since it is important that water, when injected into the cylinder absorb the maximum amount of heat without turning into steam, the determination of the central processor of the rate of travel of the piston within the cylinder will allow the central processor to determine the length of time a predetermined stroke exists. This in turn will allow the central processor to inject water into the cylinder at a time during a predetermined stroke that will allow the injected water to spend the maximum amount of time in the cylinder and thereby absorb the maximum amount of heat, without turning into steam. Informing the central processor of the amount of time the various quantities of injected water spend in the cylinder, absorbing heat, better assures that maximum heat energy is extracted, thereby resulting in a more efficient auxiliary power stroke being subsequently produced. The temperature of the water prior to it being injected into the cylinder will also be communicated to the central processor so as to aid in the calculation of the amount of heat required to convert the water into steam specifically during the second predetermined portion of the sixth stroke cycle.

The central processor will thereby be informed of the operating and performance characteristics of the IC engine under varying speed and load conditions. Such operating conditions will, of course, have a direct effect on the physical conditions within each of the cylinders during the operation of the IC engine. As a result the "energy content" of each cylinder, immediately prior to and during the injection of water into the cylinder will be determined at least partially by the central processor in order to determine the quantity of water to be injected into the cylinder as well as the time and duration of such injection.

More specifically, the quantity of water to be injected can be calculated based on the amount of heat required to convert it to steam. Also, the amount of water to be injected will be determined by the temperature of the water before its injection into the cylinder. It should be apparent that the higher the temperature of water being injected into the cylinder the greater the quantity of water that can be injected, in that less heat will have to be absorbed from the "energy content" of the interior of the cylinder into which the water is to be injected, to convert the injected water into steam.

Another directly related responsibility of the central processor is to calculate when or over what duration of the six-stroke cycle is the water to be injected. The timing of the water injection is important in order to prevent the water from being converted into steam during the compression stroke upon its injection into the cylinder. More specifically, as the water is injected, its temperature significantly and rapidly increases. Accordingly, the pressure exerted on the injected water must also significantly and proportionally increase in order to prevent the formation of steam.

As set forth above, the inventor herein described in detail in the above noted U.S. Pat. Nos. 6,311,651 and 6,571,749, that the "energy content" was capable of being determined by the on-board processor using physical parameters of the engine which included the temperature, pressure and volume of the cylinder. However, as an alternate and preferred embodiment to the invention described in the aforementioned patent, energy content or "remnant energy" may be determined in a different manner with minimal or no significant modification to the software of the on-board processor.

Accordingly, in at least one preferred embodiment of the present invention, the determination of the energy content or remnant energy within a given cylinder is derived by what may be generally referred to as a "default" determination or computation. As will be described in greater detail hereinafter, a key element in this default determination is the recognition of a predetermined value of the thermal efficiency of a particular IC engine operating under various load conditions. It is universally recognized that the thermal efficiency is the quantity of heat that is converted to motive force at the wheels of the vehicle. Further, the average thermal efficiency of an internal combustion engine is generally recognized as being generally in the range of 40%. A more precise thermal efficiency value can of course be provided, such as by the manufacturer of the engine. Accepting this 40% value, for purpose of clarity, leads to the conclusion that generally 60% of the heat or energy goes to waste. In turn, the waste heat is distributed between exhaust gasses, heat removed by the cooling system and a certain amount of loss due to friction. Therefore, as part of the aforementioned default computation, it is understood that a predetermined amount of heat energy created by the fuel injected into a cylinder is exhausted, in a conventional four stroke cycle engine, in the fourth or exhaust stroke. As a result, the energy content can be determined, by "default", once it is recognized that the thermal efficiency of the engine has a predetermined recognized value as well as the fact that generally half of the heat energy is lost in the gasses that are exhausted. Accordingly, the energy content during the third stroke of the six-stroke cycle engine, of the present invention, can be accurately and simply determined by "default", after ignition and expansion of the substantially standard fuel/air mixture. Further, in this preferred embodiment of the present invention, the end of the third stroke represents the beginning of the second predetermined portion of the cycle of the sixth stroke cycle engine, during which the injection of water begins. This of course differs from the injection of water only during the fourth stroke, as described in detailed in the above noted U.S. Pat. No. 6,311,651 by the inventor herein.

During the fourth stroke or subsequent compression stroke, the piston is rising through the cylinder so as to compress its contents, including both the combustible fluid, which had already been ignited, and the water being injected. Therefore, as the water is continuously and/or periodically being injected, in an amount based on the aforementioned "energy content" of the cylinder, during a portion or at least a majority of this compression stroke, the pressure thereon is continuously increasing. The injection of the water in a regulated and controlled manner by the central processor, as set forth above, will force the water to be maintained in a liquid state and prevent its conversion into steam until the beginning of the following power stroke. This following stroke will define an "auxiliary" power stroke because of a forced travel of the piston upon the conversion of the water into steam. The result will be a gradual decrease in pressure as the piston moves towards its bottom dead center (BDC) position during this auxiliary power stroke. Therefore, subsequent to the compression of the ignited combustible fluid and the injected water, the piston will began its travel from its top dead center (TDC) position to the BDC position with the resulting gradual decrease in pressure on the injected water. Accordingly, there will be a continuous or gradual conversion of the water into steam because of the pressure reduction thereon and the fact that the water has absorbed sufficient heat from the "energy content" within the cylinder into which it is being injected to accomplish the water to steam conversion. As set forth above, this conversion will generate an auxiliary power stroke as the piston is forced to travel from its TDC position to its BDC position.

Therefore, the improved IC engine of indicated preferred embodiments of the present invention will allow the development of significantly more power from relatively smaller size engines while operating at an increased efficiency level. The increase in efficiency will be due to the development of two power strokes using the same amount of combustible fluid or air-fuel mixture. The admission of pollutants into the atmosphere will also be reduced since the exhausting of the previously ignited combustible fluid only occurs at the end of the six-stroke cycle, along with the steam. Further, the resulting IC engine can operate on a lower compression ratio, thereby eliminating the necessity of using more expensive, high octane fuels. In addition to the above, the computer controlled IC engine of the present invention will be environmentally friendly by enabling the use of less combustible or fossil fuel, while allowing the engine to do a greater amount of work.

Yet another preferred embodiment of the present invention is directed to a power generating assembly which is particularly, but not necessarily exclusively, capable of being used as a power plant in a motor vehicle. However, while incorporating many of the structural operational features of the above set forth embodiments, the power generating assembly of the present invention need not include a six stroke cycle having both primary and auxiliary power strokes. However, the power generating assembly defining this preferred embodiment of the present invention does incorporate a continuous and gradual conversion of water into steam as injected water absorbs sufficient heat from the "energy content" within the cylinder into which it is being injected to accomplish the water to steam conversion. Further, in its most preferred form the power generating assembly of at least this embodiment of the present invention may be generally defined as a "hybrid power-train" in that both an IC engine and an electric motor are cooperatively structured and disposed in driving connection to the power takeoff or driving wheels of the vehicle in which it is installed.

While the preferred embodiments of the present invention relating to an IC engine operating through a six stroke cycle are operative for their intended purpose, it has been determined that certain disadvantages may exist therein. More specifically, the first three strokes of the afore-mentioned six stroke cycle function substantially in the conventional fashion of known IC engines, wherein the expected power output or power stroke is the result of a fuel charge being ignited. As such, when the gaseous fuel is ignited within the cylinder, the air is heated rapidly as the combustion process occurs. To this extent, the combustion process can be considered a rapid "chemical reaction" as the ignited charge expands and creates the first or primary power stroke.

However, in the subsequent three strokes of the six stroke cycle, energy is produced in compressing the heated and ignited charge concurrently to water being injected into the cylinder. During the water injection, heat from the exhaust of the ignited fuel mixture is absorbed by the injected water, but this heat absorption is done on a more "timely" basis. As a result, it has been found that the time consumed in accomplishing the fourth stroke may be insufficient or inadequate to absorb enough heat to create a sufficient quantity of steam. This latter water to steam conversion segment of the operative cycle may be considered a "mechanical process" of heat transfer where time is of great importance.

Therefore it may be generally considered that the "chemical process" which defines the ignition of the fuel mixture and the "mechanical process" of the water to steam conversion process are not compatible if attempted at the same engine speed. As such, the time allotted for completion of the fourth stroke, when the water is converted to steam, is insufficient to allow the injected water to absorb a sufficient quantity of heat to produce a requisite amount of steam.

Naturally, the engine cannot be reduced in speed during the fourth stroke to permit the right amount of heat transfer to accomplish an efficient conversion of water to steam. Therefore, one preferred embodiment of the present invention is directed to a power generating assembly which overcomes the above set forth problem by comprising alternative power sources more specifically referred to hereinafter as a first power source and a second source. As such, the first power source, being an IC engine, may operate within a first speed range. The second power source, which may be generally referred to as a water injection engine is mechanically independent of the IC engine of the first power source. Therefore, the second power source may operate at a second speed range which is slower than that of the first speed range at which the IC engine operates. As such, the water to steam conversion process has sufficient time to absorb a requisite amount of heat to operate efficiently Further distinguishing features of the power generating assembly include the IC engine of the first power source connected in direct driving relation to the power takeoff of the vehicle such as the driving wheels. To the contrary the second power source, being defined by the water injection engine, is connected in driving relation to a source of electric energy and is not connected in direct driving relation to the power takeoff.

Therefore, the hybrid categorization of the power generating assembly of the present invention is based on the use of the electric motor assembly, at least partially powered by the aforementioned source of electric energy, in combination with the aforementioned IC engine. As with known hybrid power plants, the IC engine defining the first power source and the electric motor are both connected in driving relation to the power take-off, such that the vehicle in which the power generating assembly is mounted is concurrently and/or independently powered by the IC engine and/or the electric motor assembly.

Determination of the power take-off being powered by the IC engine and/or the electric motor assembly may be at least partially dependent on load conditions of the vehicle. By way of example, under zero or light load conditions, such as when the vehicle is stopped, involved in a traffic jam, etc, the electric motor may be the sole source of power of the vehicle. However, under heavier load conditions the IC engine and the electric motor may both operate to concurrently provide power to the drive wheels or power take-off. It is emphasized that regardless of the load requirements, operation of the IC engine is necessary to provide sufficient heat, by means of its exhaust gas, to the water injection engine. This will assure an efficient water to steam conversion and that a reliable source of electric energy is available to provide sufficient electric energy to the motor on a demand basis.

As will also be explained in greater detail hereinafter, additional structural and operative features of the power generating assembly embodiment of the present invention include the source of electric energy being comprised of a generator and a battery assembly. Moreover, the second power source defined by the water injection engine is connected in direct driving relation to the generator. In turn, the generator is electrically connected to the battery assembly to facilitate and assure that the battery assembly will remain charged at all times in order that sufficient electric energy may be delivered to the electric motor on demand. Due to the fact that the second power source or water injection engine may operate independently of and therefore at a slower speed than the IC engine, sufficient time is provided for the injected water to absorb sufficient heat to be efficiently accomplish an effective water to conversion process and the development of sufficient power to drive the generator of the source of electric energy.

In this preferred embodiment the IC engine of the first power source and the water injection engine of the second power source are mounted on a common engine block. Such efficient structuring is due, at least in part, to a reduced size of the IC engine, which is made possible because the power demands of the vehicle are shared by both the IC engine and the electric motor. Further, each of the first and second power sources comprises at least one piston and cylinder assembly operative on a multi-stroke cycle, preferably such as a four stroke cycle, rather than the aforementioned six stroke cycle by which the preceding preferred embodiments of the present invention operate. Sufficient heat is transferred to the water injection engine to perform the water to conversion process by means of directing exhaust gas from the IC engine to the water injection engine. Other structural and operative features associated with an exhaust processing assembly are included in the power generating assembly embodiment of the present invention to assure that a sufficient quantity of exhaust gas, and therefore heat, is delivered to the water injection engine in an efficient and effective manner.

While this power generating assembly embodiment of the present invention is clearly distinguishable from the other preferred embodiments thereof which incorporate a six stroke cycle it should be apparent that the advantages of the water to conversion process is incorporated in the power generating assembly in order to more effectively produce a hybrid power plant which overcomes many of the disadvantages associated with known hybrid engines.

Yet another preferred embodiment of the present invention is directed to a system for recovering wasted energy from the IC engine and can be applied independently of or in combination with one or more embodiments as described above. More specifically, the additional preferred system and method of the present invention comprises the introduction of a fluid preferably such as, but not limited to, air into the system, whereat it is subjected to two separate temperature variant zones. The temperature of the introduced air is increased during passage through each of the temperature variant zones, whereat heat exchange takes place utilizing the normally wasted heat produced by the IC engine during its operation.

Moreover, each of the first and second temperature variant zones are connected to or otherwise associated with different heat sources derived from the IC engine. One such heat source comprises circulating water or other cooling fluid which removes heat from the engine block of the IC engine due to operation of the associated cooling system. In addition, a second heat source derived from the IC engine comprises the exhaust gases associated with a typical exhaust system. As such, the aforementioned first and second temperature variant zones respectively represent a low temperature phase, wherein the cooling water or fluid is utilized as the heat source and further wherein a high temperature phase is associated with the utilization of the exhaust gases as the heat source derived from the IC engine.

As set forth in greater detail hereinafter, the two heat exchange phases occurring in the first and second temperature variant zones will cause the introduced air to expand to a much larger volume which will then aid in the driving or powering of a conversion assembly. As also described, in a most preferred embodiment, the conversion system may comprise a turbine. Further, the turbine or other conversion assembly is connected in driving and/or powering relation to a power take-off including, but not limited to, an alternator which in turn energizes a battery assembly and/or is otherwise connected directly to a hybrid drive train assembly such as that typically found in and used by Toyota® and Honda® in their motor vehicles as set forth above.

It is of course recognized that the use of exhaust gases to drive turbines in turbo chargers has been known. However, one problem or disadvantage associated therewith is the exhaust gases, while having significantly high temperatures are also characterized by relatively low pressures and volumes. Low thermal efficiencies are therefore a result, at least in part, of the fact that turbines operate more efficiently under conditions of a high or expanded volume and pressure of the driving fluid rather than primarily on the high temperatures of the driving gasses. Accordingly, by utilizing or producing gasses at higher or expanded pressure/volume in this preferred embodiment of the present invention, a more efficient use is made of the normally wasted heat energy of an IC engine, which is typically and purposefully removed from the IC engine by the exhaust gases and/or by the circulating cooling water or other fluid associated with the cooling system.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIGS. 2A through 2F consecutively represent successive strokes of at least one of a plurality of piston and cylinder assemblies incorporated within the internal combustion engine of the present invention while operating on a six-stroke cycle.

Like reference numerals refer to like parts throughout the several views of the drawings.

DETAILED DESCRIPTION OF THE PREFERRED EMBODIMENT

Figure 1:
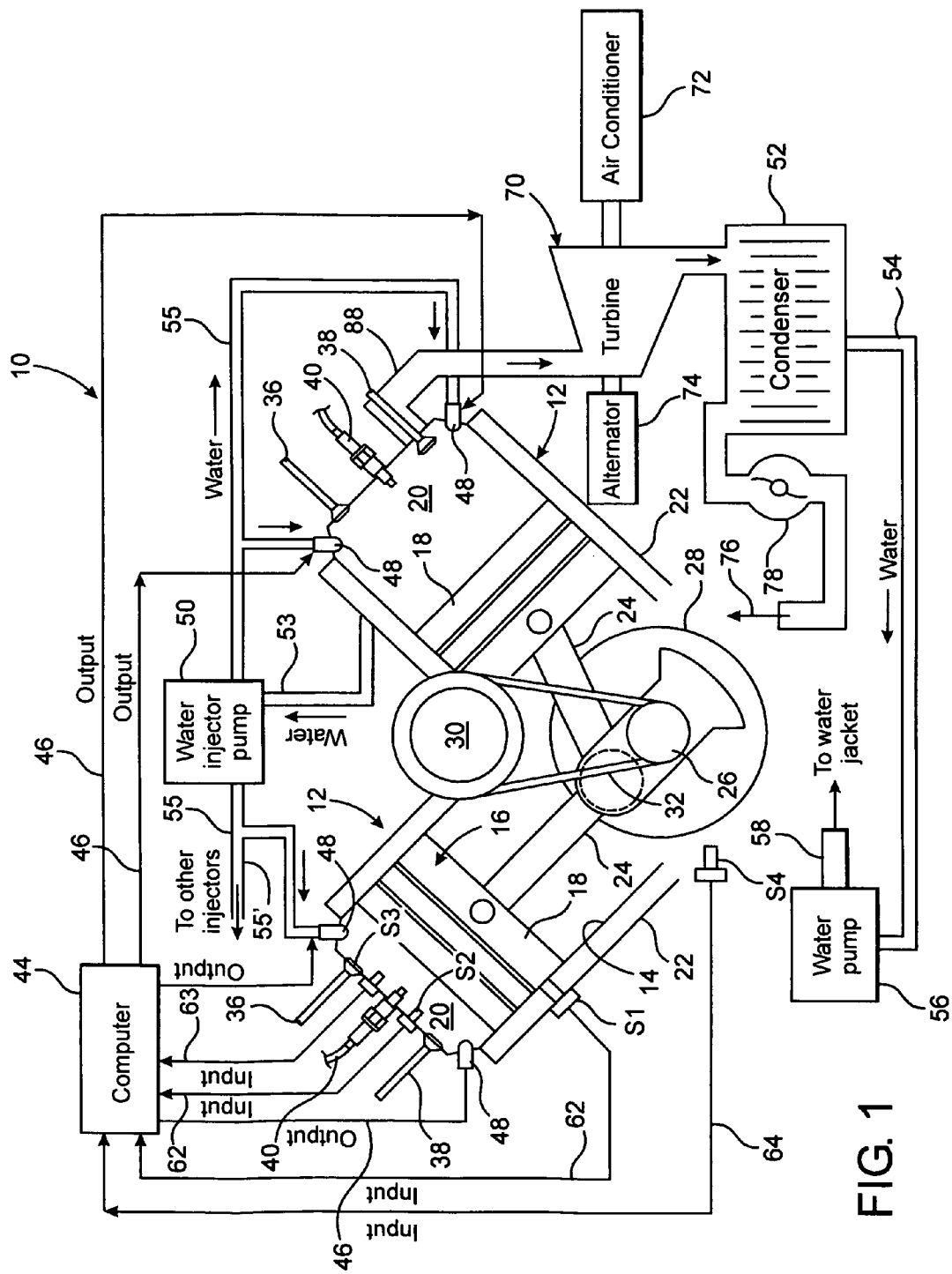
FIG. 1 is a schematic representation of various operative components of a computer controlled internal combustion engine according to the present invention.

One or more preferred embodiments of the present invention are directed towards a computer controlled internal combustion (IC) engine, and its method of operation. Moreover, the subject IC engine is designed to operate on a six-stroke cycle and provide an auxiliary power stroke through the regulated injection of water into the combustion chamber or cylinder of one or more piston and cylinder assemblies of the engine and the conversion of the injected water into steam. It is emphasized that while related preferred embodiments of the present invention will be explained primarily with reference to a single piston and cylinder assembly, having an at least partially conventional design, the computer controlled IC engine of the present invention may be of the type incorporating one or a plurality of such piston and cylinder assemblies and may be specifically adapted for use as the power source in an automobile, truck or other motorized vehicle.

With primary reference to the FIGS. 1 and 2A through 2F, the IC engine of the present invention has a plurality of operative components schematically represented and collectively indicated as 10. The IC engine 10 comprises preferably a plurality of piston and cylinder assemblies generally indicated as 12 which include a cylinder 14 having a piston 16 including piston head 18 reciprocally mounted within the interior 20 of the cylinder 14. A water jacket 22 is disposed in surrounding relation to the cylinder 14 and is designed to have a quantity of water circulating there through so as to provide proper cooling to each of the piston and cylinder assemblies 12. The piston heads 18 are connected by piston shafts 24 to a driven crank shaft 26 attached to fly wheel 28. In addition, a cam shaft 30 is driven by an interconnecting belt or like structure 32 and is rotated or driven at an applicable gear ratio, such as a preferred ratio of 3 to 1. In addition, each of the piston and cylinder assemblies 12 includes an intake valve 36 and an exhaust valve 38 cooperatively structured to regulate fluid flow into an out of the interior 20 of the cylinder 14. An ignition source 40 may be in the form of a spark plug, glow plug or any other means for igniting a combustible fluid, such as a conventional air-fuel gaseous mixture, in an internal combustion engine.

The IC engine, as described above, will operate in a conventional fashion through the first three strokes of the aforementioned six-stroke cycle to the extent that a combustible air-fuel gaseous mixture will be forced into the cylinder interior 20 by appropriate structure (not necessary to be shown as this is within the knowledge of persons of skill in the art), where it will be compressed and subsequently, ignited by the ignition source 40. Upon ignition, the expansion of the ignited gasses will cause the piston 18, in each of the cylinders 14, to be driven downwardly from its top dead center (TDC) position to its bottom dead center (BDC) position, thereby defining a power stroke. The power stroke drives the crank shaft 26 and fly wheel 28 and provides moving force to the vehicle in which the IC engine 10 is mounted.

With further reference to FIG. 1, important operative components of the present invention include a computer or central processor 44 which is interconnected by outputs 46 to a plurality of injector structures 48. Each of the cylinders 14 has at least one, but preferably, a plurality of the injector structures 48 mounted thereon in direct fluid communication with the cylinder interior 20. The injector structures 48 are designed to direct water at prescribed times and in a prescribed manner into the cylinder interiors 20. As will be explained in greater detail hereinafter, the water may be injected in small amounts or "periodically" during a predetermined portion of the six-stroke cycle.

The water to be injected is preferably supplied from the water circulating through the water jackets 22 surrounding each of the cylinders 14. The water jackets 22 may comprise a part of a water supply and what may be referred to as a closed water system. The term "closed water system" refers to the fact that the water injected into the interior 20 of each of the cylinders 14 is retrieved and re-circulated so as to flow back into the interior of the water jackets 22 to maintain the predetermined lower temperature of the cylinders 14. As will be explained in greater detail hereinafter, the closed water system also includes a water injector pump 50 connected by appropriate conduits 53 and 55 between the one or more water jackets 22 and each of the injector structures 48. The closed water system further preferably includes a condenser 52 designed to receive steam from the exhaust exiting each of the cylinder interiors 20, through outlet 88. The condenser 52 collects the water recovered by condensing the retrieved steam and forces it through return line 54 by means of a water return pump 56. The water is further directed by conduits 58 back to each of the one or more water jackets 22, thereby further defining the aforementioned closed water system.

As set forth above, one inventive feature of this preferred embodiment of the present invention is the injecting of the water in specific quantities and during a specific portion of the six-stroke cycle, wherein the amount and time of water injection for each cylinder is controlled by the central processor 44. In order to aid in the determination of at least some of the parameters as set forth above, a sensor assembly is mounted on the various operative components of the IC engine 10 and is structured to determine certain physical characteristics of the engine. Further, the sensor assembly transmits the sensed or determined data to the central processor 44 for processing. Accordingly, the sensor assembly of the present invention comprises at least one, but preferably, a plurality of sensor structures mounted at various locations on the IC engine 10 and which are specifically structured to sense and determine specific, predetermined physical and/or operative characteristics required for appropriate calculation by the central processor 44.

The plurality of sensors of the sensor assembly includes a sensor structure $S_1$ mounted in the vicinity of the water jacket 22 and structured to determine the temperature of the water prior to it being injected into the cylinder interior 20. The temperature of the water prior to injection is important because the greater the temperature of the water to be injected the greater quantity of water that can be injected because less heat is required to be absorbed from the "energy content" of the cylinder to convert the water into steam. More specifically, the hotter the water being injected, the less amount of heat or energy need be taken from the interior of the cylinder, subsequent to the combustible fluid being ignited, in order that the water be converted into steam in a controlled manner, as will be explained in greater detail hereinafter.

The sensor assembly of the present invention also includes at least one but preferably a plurality of additional sensor structures $S_2$ and $S_3$ both of which may be mounted in the same cylinder interior 20 or each of which may be mounted in a different cylinder interior. Therefore, the temperature and pressure of the cylinder interiors 20 of the various piston and cylinder assemblies 12 may also be determined and directed to the central processor 44 for further processing. As set forth above the temperature and pressure of the cylinder interior are primarily used in determining the "energy content" of the cylinder immediately prior to the injection of water therein when practicing at least one preferred embodiment of the present invention disclosed and claimed in the above noted patent, by the inventor herein.

While the determination of the energy content in the preferred embodiment as described hereinafter may differ, it is emphasized that the determination of the energy content will directly affect the quantity of water being injected as well as the time and/or duration such water injection will take place during a predetermined portion of the six-stroke cycle. Also, a sensor structure $S_4$ is mounted on the engine in the vicinity of the fly wheel 28 and/or crank shaft 26 in order to determine engine speed. Engine speed is, of course, directly related to the speed of the travel of the piston head 18 within the cylinder interior, which in turn may be communicated to the central processor 44 so as to determine the length of time a particular stroke exists during the six-stroke cycle.

In order to obtain the maximum power from the auxiliary power stroke or fifth stroke, the injected water should remain within the cylinder a maximum amount of time, during the fourth stroke, so as to absorb a maximum amount of heat, without turning into steam during the fourth stroke. Heat absorption during the fourth stroke depends, at least in part, upon the length of time of the fourth stroke and that time is dependent on the time the piston head 18 takes to travel from its BDC position to its TDC position. The central processor 44 must be informed of the amount of time each injection of water spends in the cylinder absorbing heat, during the fourth stroke, without turning into steam, so that the maximum heat energy can be extracted, thereby assuring that a more efficient fifth stroke or auxiliary power stroke is produced. The length of time of the fourth stroke is measured by determining the engine speed which, as set forth above, is directly related to the time of travel of the piston head 18 from BDC to TDC. The data relating to engine speed, as determined by sensor structure $S_4$, is particularly important when the vehicle is operating at varying speed or load conditions. Such varying operative conditions will have a direct effect on the mass of combustible fluid forced into the interior 20 of each of the cylinders 14.

Interconnection between each of the plurality of sensor structures $S_1$, $S_2$, $S_3$, and $S_4$ is by means of any type of applicable electrical connection such as at 61, 62, 63 and 64 respectively. It should also be noted that for purposes of clarity, FIG. 1 depicts the various sensors $S_2$ and $S_3$ being mounted in operative position with regards to only a single cylinder interior 20. However, it is emphasized that an increased number of such sensor structures can be mounted in operative relation to each of the piston and cylinder assemblies 12 which are incorporated in the IC engine 10 of the present invention.

FIGS. 2A through 2F, demonstrate the operation of the internal combustion engine 10, by a successive representation of each stroke of a six-stroke cycle. The six-stroke cycle comprises a first intake stroke demonstrated in FIG. 2A. During the intake stroke, a combustible fluid 80, preferably in the form of an air-fuel gaseous mixture, is drawn into the interior of the cylinder 20 through inlet 82 upon an opening of the intake valve 36. As crank shaft 26 serves to rotate the piston 16, the piston head 18 travels along the length of the cylinder interior 20 until it reaches its Bottom Dead Center (BDC) position, which defines the beginning of a compression stroke, illustrated in FIG. 2B.

The compression stroke of the six-stroke cycle is characterized by the intake and exhaust valves 36 and 38 respectively, both being maintained in a closed position, such that the upward travel of the piston head 18 within the cylinder interior 20 will cause a compression of the combustible fluid 80 as the piston head 18 reaches its Top Dead Center (TDC) position at the beginning of a third or power stroke, represented in FIG. 2C. Upon compression being completed as the piston head 18 reaches TDC, the ignition source 40 will be activated to ignite the combustible fluid 80 forcing the piston head 18 downwardly into its BDC position and causing the forced rotation of the crank shaft 26. The BDC position of piston head 18 is represented in FIG. 2D.

In this embodiment of the present invention, FIG. 2D is representative of both the end of the third stroke as well as the beginning of the fourth stroke of the six-stroke cycle. Accordingly, the internal combustion engine 10 of the present invention operates in a substantially conventional fashion through the first three strokes, represented by FIGS. 2A, 2B and 2C of the six-stroke cycle. Therefore the "energy content" of the interior 20 of each of the cylinders 14, starting generally at the end of the third stroke is to be determined for purposes of deciding the quantity and duration of water injection as emphasized herein.

As set forth above the preferred embodiment of the present invention comprises the determination of the energy content of each of the one or more cylinders utilizing a "default" determination or computation based on certain known or determined parameters including thermal efficiency on a particular IC engine and other related factors. More specifically, with any given IC engine the thermal efficiency, dependent in part on the variable operative conditions of the engine, is recognized as the quantity of heat that is converted to motive force at the wheels of the vehicle. The average thermal efficiency of an internal combustion engine is generally 40%. This means that approximately 60% of the heat goes to waste of the 60% of waste heat, half or 30% is lost in the exhaust gasses. An additional 25% is lost or removed by the cooling system associated with the engine. An additional 5% is lost due to friction. Therefore, by "default" we automatically know that generally about 30% of the heat of the fuel injected into any cylinder is lost with the exhaust gasses, in the conventional four stroke cycle engine, in the fourth or exhaust stroke. However it is recognized that in determining the parameters utilized in the default computation or determination of the energy content of a given cylinder, that the amount of heat lost to exhaust gasses may vary from the above noted 30%.

Therefore, applying the default determination of the preferred embodiment of the six-stroke cycle engine of the present invention, and with minimal or no modification to the software of the existing on-board computer, the "remnant"

energy or energy content of a cylinder at the end of the third stroke may be automatically, simply and accurately determined at the moment the fuel is injected into the cylinder. More specifically, the default determination of the energy content or remant energy of a given cylinder is as follows:
- a) mass of fuel injected per cylinder×calorific value per unit mass=total energy input per cylinder.
- b) total energy×thermal efficiency=motive force (horse power)
- c) total energy×30% (recognized value of the heat loss to exhaust gasses)=remant heat energy or energy content at the end of the third stroke.

As set forth above it is recognized that in a conventional four stroke engine, the beginning of the fourth stroke, immediately prior to the end of the third stroke, represents the beginning of the exhaust of the gasses in which 30% or a pre-recognized value of heat is loss. As set forth in detail herein the energy content of the cylinder is the value needed in determining a continuation of the forth and fifth stroke of the sixth stroke cycle of the present invention utilizing the controlled water to steam conversion. More specifically and as also emphasized herein the energy content of a given cylinder is determinative, along with other factors set forth herein, of the quantity and time period of water injected into the cylinder.

The fourth stroke comprises the piston head moving from a BDC position, representing the end of the third stroke, to a TDC position, thereby decreasing the volume within the cylinder interior 20 and resulting in an increased pressure on the water being injected into the cylinder interior 20. Accordingly, even though the temperature of the water being injected is increasing, the pressure is also increasing which, according to the aforementioned "Steam Tables" forces the water to be maintained in a liquid state as it is being continuously and/or periodically injected to the cylinder, preferably beginning at the end of the third stroke and during at least a majority of the duration of the fourth stroke represented in FIG. 2D. The water being injected is, therefore, prevented from turning into steam as soon as it is injected. In order to further assure proper and accurate determination of the energy content and as a result, both the quantity of water to be injected and the time or duration of water injection, the sensor structure $S_1$ further inputs into the central processor 44, the temperature of the water prior to it being injected. As set forth above, the hotter the water being injected the less amount of heat required to convert the water from water to steam and the greater amount of water that can be injected into the cylinder interior 20.

For purposes of clarity, the determination of the energy content is derived at what may be referred to as a first predetermined portion of the six-stroke cycle of the engine of the present invention. In addition, the water is injected, once the energy content of the cylinder has been determined, at the beginning of a second predetermined portion of the six-stroke cycle. Distinguishing the first and second predetermined portions of the six-stroke cycle from one another is of note since the energy content of a cylinder need be known preferably, immediately prior to injection of the water into the cylinder. Accordingly, the first predetermined portion of the cycle is herein defined as generally at the end of the third stroke and prior to the injection of water into the cylinder. Once the energy content of the cylinder is determined, the water is preferably injected at the end (BDC) of the third stroke and may continue during at least a portion or a majority of the fourth stroke. Therefore, the beginning of the injection of water at the end of the third stroke is herein defined as the second predetermined portion of the six-stroke cycle. It is again noted that this embodiment therefore differs from that disclosed in the above noted patent by the inventor herein, wherein the injection of water occurred in the second predetermined portion of the six-stroke cycle which was therein defined as the fourth stroke thereof.

Further, the pressure exerted on the injected water will be determined by the rate at which the cylinder interior 20 decreases in volume. This, of course, is directly proportional to the rate of the travel of the piston head 18 as it travels from its BDC position to its TDC position during the duration of the forth stroke. As set forth above, in order to absorb the maximum heat without turning into steam, the water must remain within the cylinder during the fourth stroke for a maximum amount of time in that heat absorption in the fourth stroke depends, at least in part, upon the duration or length of time the stroke exists. This in turn depends upon the time it takes the piston head 18 to travel from its BDC position to its TDC position. Therefore, sensor structure $S_4$ is disposed and structured to determine the engine speed which is directly related to the rate of travel of the piston head 18 within the interior 20 of the cylinder 14 which is determinative of the time duration of the fourth stroke.

Upon reaching its TDC position at the beginning of the fifth stroke, as represented in FIG. 2E, the direction of the travel of the piston head 18 will reverse, traveling back towards its BDC position. The resulting increase in the volume of the cylinder interior 20 will decrease the pressure on the water injected during at least a majority of the duration of the fourth stroke (FIG. 2D). This decrease in pressure will allow the water to be converted into steam on a continuous basis as the pressure continuously decreases because of the downward travel of the piston head 18 within the cylinder interior 20, resulting in the auxiliary power stroke. Instantaneous "flashing" of all of the water injected during the end of the third stroke and during the fourth stroke as represented in FIG. 2D will be prevented since the pressure within the cylinder during the fifth, auxiliary power stroke represented in FIG. 2E, will be sufficient to maintain at least some of the water in a liquid state until the piston approaches the BDC position.

The sixth stroke represented in FIG. 2F is characterized as an exhaust stroke with the intake valve 36 maintained in a closed position and the exhaust valve 38 maintained in an open position, until the end of the sixth stroke. More specifically the combined steam and previously ignited combustible fluid 84' will be exhausted through outlet 88 upon an opening of the exhaust valve 38. It should be noted that the combustible fluid ignited during the initial power stroke, or stroke three, represented in FIG. 2C, will not be exhausted until the sixth stroke and will be exhausted from the interior of the cylinder 20 at the same time as the steam.

With reference to FIG. 1, the exhausting of the steam and ignited combustible fluid will pass from outlet 88 to the exhaust system after having first passed through the condenser 52, as set forth above. As also schematically represented in FIG. 1, the exhaust passing through the outlet 88 from the one or more chambers 12 may first be directed in driving relation to a conversion assembly such as, but not limited to, a turbine generally indicated as 70. In turn, the work energy produced by the turbine 70 or other conversion assembly may be used to drive one or more power take-offs associated with other auxiliary or primary operating systems of the vehicle such as, but not limited to, an air conditioner 72 and/or alternator 74. As will be explained in greater detail hereinafter, the driving of the conversion assembly or turbine 70 in the manner generally described herein will be supplemented in yet another, preferred embodiment of the present invention. Further, after the exhaust gases pass into and through the condenser 52, resulting in the removal of water therefrom as at 54, the remaining exhaust gases may eventually pass through the exhaust system 76. For purposes which will also be explained in greater detail hereinafter, the compression, as at 78, of the exhaust gases may have performance and/or operating benefits.

In summary, the central processor 44 accomplishes the following, based on its responsiveness to some or all of the data received from the plurality of sensors $S_1$, $S_2$, $S_3$ and $S_4$ of the sensor assembly:

a) determines the "energy content" beginning at the end of the third stroke using the physical characteristics within the cylinder as sensed in whole or in part by the sensor assembly and determines the amount of energy that can be extracted from within the cylinder in order to convert the water to steam.

b) calculates the amount of water to be injected based on the previously determined "energy content" as well as the temperature of the water being injected before it enters the cylinder.

c) regulates and/or activates the injector structures 48 so as to inject the correct quantity of water periodically preferably beginning at the end of the third stroke and possibly continuing during a portion or at least a majority of the fourth stroke, using one or more injector structures 48 associated with each cylinder.

d) prevents the turning of water into steam on an instantaneous basis during the fourth stroke but rather regulates the conversion of water to steam on a controlled basis, substantially continuously over at least a majority of the duration of the fifth stroke, which is defined as the auxiliary power stroke of the six-stroke cycle.

As set forth in detail in FIGS. 3 and 4A through 4D, yet another preferred embodiment of the present invention comprises a power generating assembly generally indicated as 90. The power generating assembly 90 as with the preferred embodiments, described above, is particularly, but not exclusively, adaptable for use as the power plant of a motor vehicle. In addition, the power generating assembly 90, while incorporating certain of the structural and operational features described above and specifically relating to the water to steam conversion process, differs from the previously described embodiments of the present invention by being generally categorized as a "hybrid" power generating assembly.

As such, the power generating assembly 90 of the present invention comprises alternative power sources including a first power source 92 and a second power source 94, both of which are preferably mounted on a common engine block schematically indicated as 96. The hybrid aspects of the power generating assembly 90 are more clearly defined by the fact that the power take-off or drive wheels 98 of the vehicle in which the power generating assembly 90 is mounted receives power from both the first power source 92 and an electric motor 100. Accordingly, both the first power source 92 and the electric motor 100 are connected in direct driving relation to the power take-off 98 preferably through a transmission assembly 102. Also, in that the power demands of the vehicle are shared by the first power source 92 and the electric motor 100, the first power source may have a comparably reduced size, thereby further facilitating the mounting of the first and second power source on a common engine block 96.

It is of course important for the efficient operation of hybrid vehicles to maintain a continuous source of power either from the first power source 92 or the electric motor 100 or both. Therefore, the electric motor 100 is electrically connected to and capable of being continuously powered by a battery assembly 104. However, a distinguishing feature of the power generating assembly 90 is the maintenance of the battery assembly 104 in a continuous charged state through the provision of a generator assembly 106 connected in direct driven relation by the second power source 94. Moreover, a most preferred embodiment of the power generating assembly 90 comprises the first power source 92 being in the form of an internal combustion engine (IC) 92' having at least one, but more practically, a plurality of piston and cylinder assemblies of the type described in FIGS. 2A through 2C. The IC engine 92' defining the first power source 92 preferably operates through a multi-stroke cycle, such as a four stroke cycle.

The second power source 94 may be generally described as a water injection engine 94' and, while mounted on a common engine block 96 as the IC engine 92', functions independently of but in cooperation with the IC engine 92'. The water injection engine 94' creates useable power based on the water to steam conversion process as described with particular reference to FIGS. 2D through 2F of the embodiment of FIGS. 1 and 2 as described above. More specifically, the water injection engine 94' includes at least one piston and cylinder assembly generally indicated as 12' and shown in operation and detail in FIGS. 4A through 4D. As with the embodiment of FIG. 2D through 2F water is injected into the cylinder 14 by means of an injection assembly 48 deriving a supply of water from a water jacket 22 regulated by a water injection pump 50'. Similarly, a central processing unit (CPU) 44' regulates the timing of the water injection and the overall operation of the water injection engine 94' as well as certain operative features of the power generating assembly 90 as explained with reference to the embodiment of FIGS. 1 and 2 above. A plurality of sensors S1, S2, S3, S4, etc, may be strategically located throughout the engine block 96 and/or power generating assembly 90 and serve the same function of at least determining the "energy content" of a particular cylinder 14 into which the water is to be injected.

The heat required to facilitate the conversion of the injected water into steam is supplied by the exhaust gas issuing from the IC engine 92'. Again with reference to FIG. 3, the one or more piston and cylinder assemblies 12' included in the water injection engine 94' may be of smaller size than the piston and cylinder assemblies 12 associated with the IC engine 92'. Accordingly an exhaust processing assembly generally indicated as 108 is also incorporated within the power generating assembly 90.

The exhaust processing assembly 108 comprises a compressor 110 connected in direct fluid communication and receiving relation to an exhaust portion of the IC engine 92' as at 111. In order to accommodate the preferably smaller cylinder size of the one or more piston and cylinder assemblies 12', the volume of the exhaust gas issuing from the IC engine 92' is reduced by activation of the compressor 110. Once compressed, it is transferred to a reservoir 112 which is disposed in fluid communication with the water injection engine 94'. Moreover, the exhaust gas 114 is transferred as needed directly from the reservoir 112 to the one or more piston and cylinder assemblies 12' during an intake stroke as demonstrated in FIG. 4A of the water injection engine 94'. A conduit 112' establishes direct fluid communication between the reservoir 112 and the water injection engine 94' through which the exhaust gas 114 may be received within the cylinder 14 during the intake stroke of FIG. 4A.

As schematically and sequentially represented in FIGS. 4A through 4D, operation of the water injection engine 94' of the second power source 94 comprises the intake stroke of FIG. 4A, wherein the exhaust gas 114 enters the cylinder 14. The second stroke represented in FIG. 4B comprises a compression stroke, wherein the combination 116 of the hot exhaust gas and injected water are compressed. The water is injected through the injection assembly 48 into the cylinder 14 in the manner described with reference to the embodiment of FIGS. 1 and 2. The third stroke represented in FIG. 4C comprises the power stroke, wherein the water converts to steam based on the heat derived from the exhaust gas 114. FIG. 4D represents the exhaust stroke wherein the steam 118 is exhausted through the outlet valve 38 subsequent to the completion of the power stroke of FIG. 4C.

Moreover, in order to effectively provide sufficient time for the "mechanical process" of converting the injected water into steam, the first and second power sources 92 and 94 respectively are structured to operate within different speed ranges. More specifically, the IC engine 92' operates primarily within a first speed range which is significantly greater than a second speed range in which the second power source 94 primarily operates. As a result, the water injection engine 94' of the second power source 94 primarily operates within a second speed range which is slower and allows the "mechanical process" of converting the injected water into steam to occur in an efficient and effective manner.

Also since the first and second power sources 92 and 94 operate substantially independently of one another, the power output shaft 97 of the IC engine 92' is connected in direct driving relation to the power output 98. Conversely, the power output shaft 99 of the water injection engine 94' is connected in direct driving relation to the source of electric energy defined at least in part by the generator 106 and the battery assembly 104. It should be apparent therefore that the primary purpose of the second power source is to maintain active and required running engagement of the generator 106 in order to maintain the battery assembly adequately charged at all times. This of course results in a sufficient quantity of an electrical energy being delivered to the electric motor 100 by appropriate electrical connections there between, as at 118.

Other structural and operative features of the power generating assembly 90 includes a take-off or venting valve 120 which will serve to vent the exhaust gas from the IC engine 92', downstream of the compressor, to an appropriate catalytic converter or other exhaust treatment facilities when it is determined when the reservoir 112 has sufficient or predetermined capacity to supply the second power source 94 with the hot exhaust gas. Also appropriate input and output connections 46' and 61' serve to establish a working relation between the sensors S1 through S4, as described with reference to the embodiment of FIG. 1, and the CPU 44'. Therefore the water to steam conversion process is at least partially controlled by the CPU 44' based at least in part on the energy content of the piston and cylinder assembly 12' as well as other physical and operative characteristics of the power generating assembly, as described above with reference to the embodiment of FIGS. 1 and 2. Similarly, appropriate conduit 55' serves to interconnect and deliver water to be injected to the one or more piston and cylinder assemblies 12' from the water injection pump 59.

Figure 5:
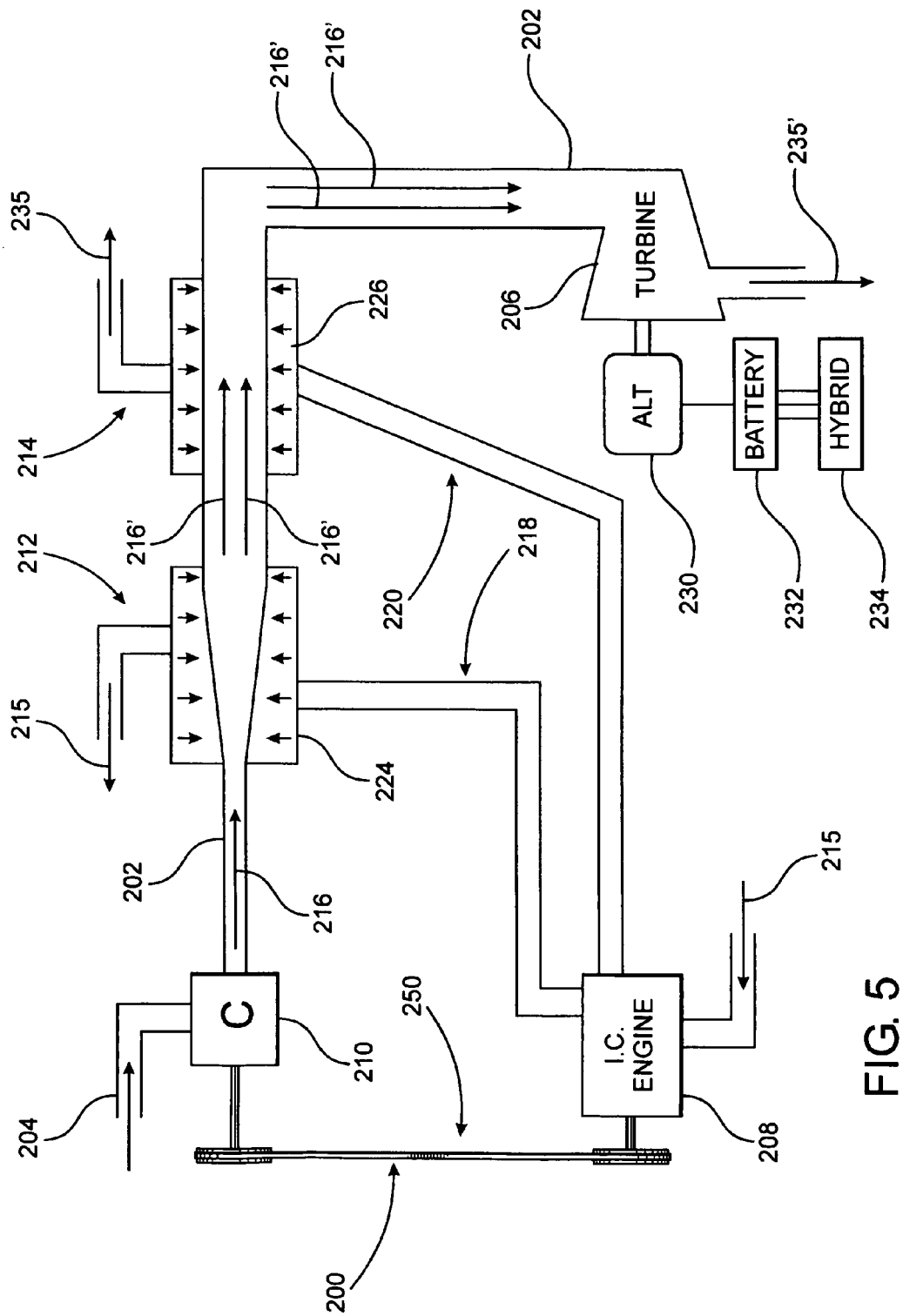
FIG. 5 is a schematic representation of yet another preferred embodiment of the present invention comprising a system and method for recovering wasted energy from an IC engine utilizing separate heat sources derived from the IC engine.
Figure 6:
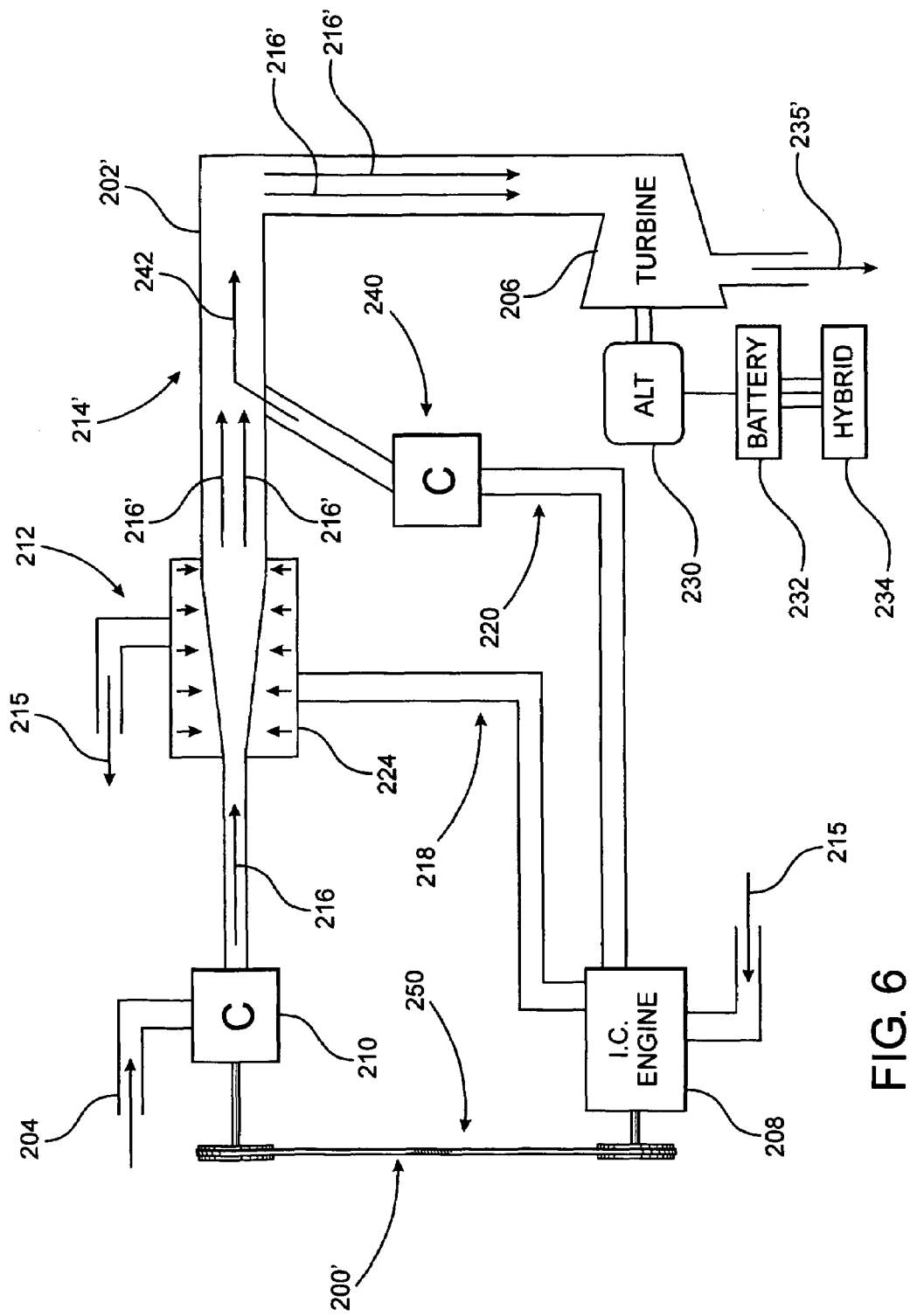
FIG. 6 is a structural and operational modification of the embodiment of FIG. 5 and represents yet another preferred embodiment of the present invention directed to the recovery of waste energy, in the form of heat, from an IC engine.

Yet another most preferred embodiment of the present invention is schematically represented in FIG. 5 and 6 and is directed to a system for recovering wasted energy, primarily in the form of heat, from an IC engine. The recovered heat energy is used to drive or power a conversion assembly structured to produce work energy or power. As more fully described, the resulting work energy or power derived from the conversion assembly may be appropriately used to drive or power the operating systems associated with a hybrid drive train, such as of the type referred to above.

More specifically, the system of this preferred embodiment of the present invention is schematically represented in FIGS. 5 and 6 and generally indicated as 200 and 200', respectively. The system 200 comprises a path of fluid flow 202 disposed and structured to direct a predetermined flow of fluid from a fluid inlet 204 to a conversion assembly 206. As will be discussed in greater detail hereinafter, the fluid passing into the system through the inlet 204 is preferably air and may be more specifically defined as ambient air existing and/or derived from an exterior of the system 200. In order to facilitate a significant increase in efficiency and operating performance of the vehicle or other platform with which an IC engine 208 is operatively associated, the incoming air or other fluid is directed to a compressor assembly 210. As represented, the compressor assembly 210 is disposed in fluid communication with the path of fluid flow 202 and in fluid receiving relation to the fluid inlet 204. Compression of the incoming air or like fluid reduces the volume thereof as it passes into and along at least a beginning or introductory portion of the path of fluid flow 202.

Additional structural and operative features of the wasted energy recovery system 200 of the present invention include the provision of a first temperature variant zone 212 and a second temperature variant zone 214. Both the first and second temperature variant zones 212 and 214 are disposed in communicating and more specifically heat exchanging relation to the path of fluid flow 202 and to the flow of air or other fluid 216 passing along corresponding portions of the path of fluid flow 202. Moreover, the first temperature variant zone 212 is located upstream of the second temperature variant zone 214, wherein each of the first and second temperature variant zones 212 and 214 are disposed and structured to accomplish heat transfer between different heat sources, derived from the IC engine 208, and the air or other fluid 216 passing along the path of fluid flow 202.

As set forth above and as well recognized in the field of internal combustion engines, the average thermal efficiency of an IC engine is generally about forty percent. This means that approximately sixty percent of the heat generated by an IC engine goes to waste. Of the sixty percent of waste heat, approximately half or thirty percent is lost or removed from the IC engine by exhaust gases associated with the exhaust system of the vehicle or other platform associated with the IC engine. In addition, an additional twenty-five percent is lost or removed by the circulating cooling fluid associated with the cooling system also disposed and structured to purposefully remove heat from the IC engine block, during its periods of operation.

Accordingly, instead of discarding the energy lost through waste heat, as set forth above, the system 200 of the present invention associates and/or connects each of the first and second temperature variant zones 212 and 214 with a different one of a first and second heat source 218 and 220 respectively, each derived from the IC engine 208. The first heat source generally and schematically indicated as 218 may be at least partially defined by the circulating water or other cooling fluid associated with the cooling system of the IC engine 208. In contrast, the second temperature variant zone 214 is associated with or connected to the second heat source generally indicated as 220, which is at least partially defined by the exhaust gases derived from the IC engine 208, such as by exhausting the operating cylinders 12 as described in detail with the above-noted embodiments of FIGS. 1 through 4.

Because of the nature or operating characteristics of the respective heat sources 218 and 220 derived from the IC engine 208, it should be apparent that the first temperature variant zone 212 may define what is referred to as a low temperature phase or low temperature heat exchange zone due to the fact that a lesser amount of heat is removed from the IC engine 208 by the circulating water or other cooling fluid associated with the cooling system of the IC engine 208. In contrast, the second temperature variant zone 214 represents or generally defines what may be referred to as a high temperature phase or high temperature heat exchange zone, wherein a greater quantity of heat is removed from the engine block of the IC engine 208. The heat of the exhaust gases is exchanged with the air or other fluid 216 defining the fluid flow passing through the indicated path of fluid flow 202, at the location of the second temperature variant zone 214.

In order to accomplish efficient heat exchange between the respective heat sources 218 and 220 associated with the first and second temperature variant zones 212 and 214, the preferred embodiment represented in FIG. 5 comprises the inclusion of a first heat exchange assembly 224. As indicated, the heat exchange assembly 224 is disposed at and at least partially defines the first temperature variant zone 212. Similarly, a second heat exchange assembly 226 is disposed at and at least partially defines the structure and operation of the second temperature variant zone 214. As schematically represented, each of the first and second heat exchange assemblies 224 and 226 are disposed in heat transferring relation to the path of fluid flow 202 and more specifically to the flow of air or fluid 216 passing there along.

Therefore, in accordance with the law of thermodynamics heat exchange between the respective heat sources 218 and 220 and the compressed fluid flow 216 will cause an expansion in volume and increase in pressure of the flow of air or fluid, as at 216'. As represented, a first heat transfer to the fluid flow 216/216' will occur at the first temperature variant zone 212 associated with the heat exchange assembly 224. Thereafter and downstream thereof, the second heat exchange assembly 226, associated with the second temperature variant zone 214, will accomplish an additional and greater transfer of heat between the exhaust gases of the heat source 220 and the flow of fluid 216'. As a result, an additional expansion and/or pressure increase of the fluid flow 216' will be accomplished as it is exposed to the increased heat of the second temperature variant zone 214. The expanded volume of fluid flow 216', subsequent to leaving the second temperature variant zone 214, will be directed to the aforementioned conversion assembly 206.

In the most preferred embodiments represented in FIGS. 5 and 6, the conversion assembly 206 is a gas driven turbine. By the transferring of heat to the fluid flow 216' subsequent to being compressed as at 210, the air or fluid flow 216 will have a significantly increased pressure and expanded volume as schematically represented as 216'. Accordingly, by transferring the heat of the exhaust gases as well as the heat from the cooling fluid to the air flow 216 and 216' resulting in a higher pressure/higher volume thereof, a more efficient operation of the turbine 206 will result. Such effective and efficient operation, driven by the expanded volume and pressure of the fluid flow 216' will in turn result in generation of sufficient work energy or power to drive one or more power take-offs comprising an alternator and/or battery assembly as at 230 and 232 respectively.

Figure 3:
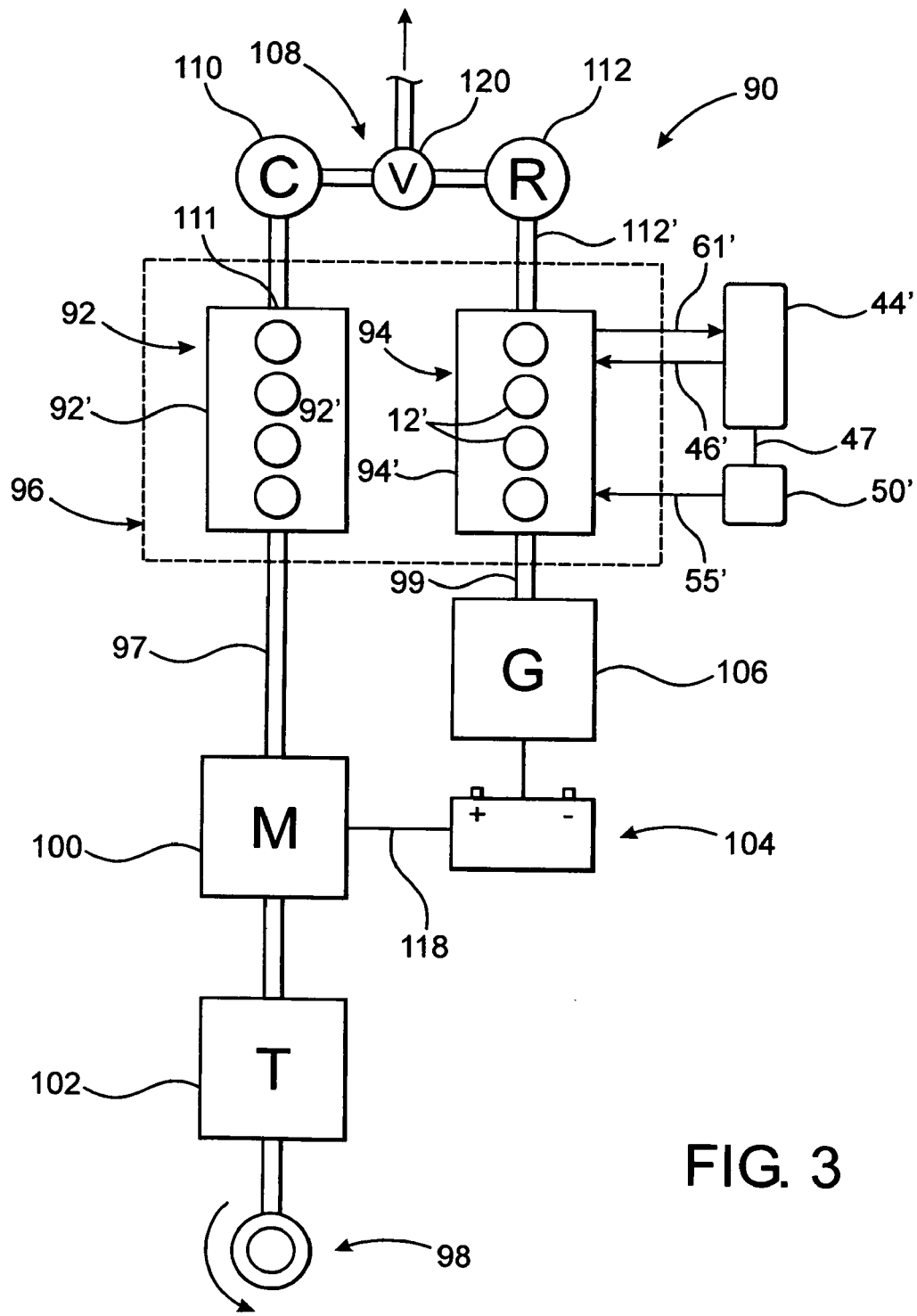
FIG. 3 is a schematic representation of another preferred embodiment of the present invention directed to a power generating assembly utilizing alternative power sources and incorporating at least some of the structural and operational features associated with the preferred embodiment of FIGS. 1 and 2A through 2F.
Figure 4:
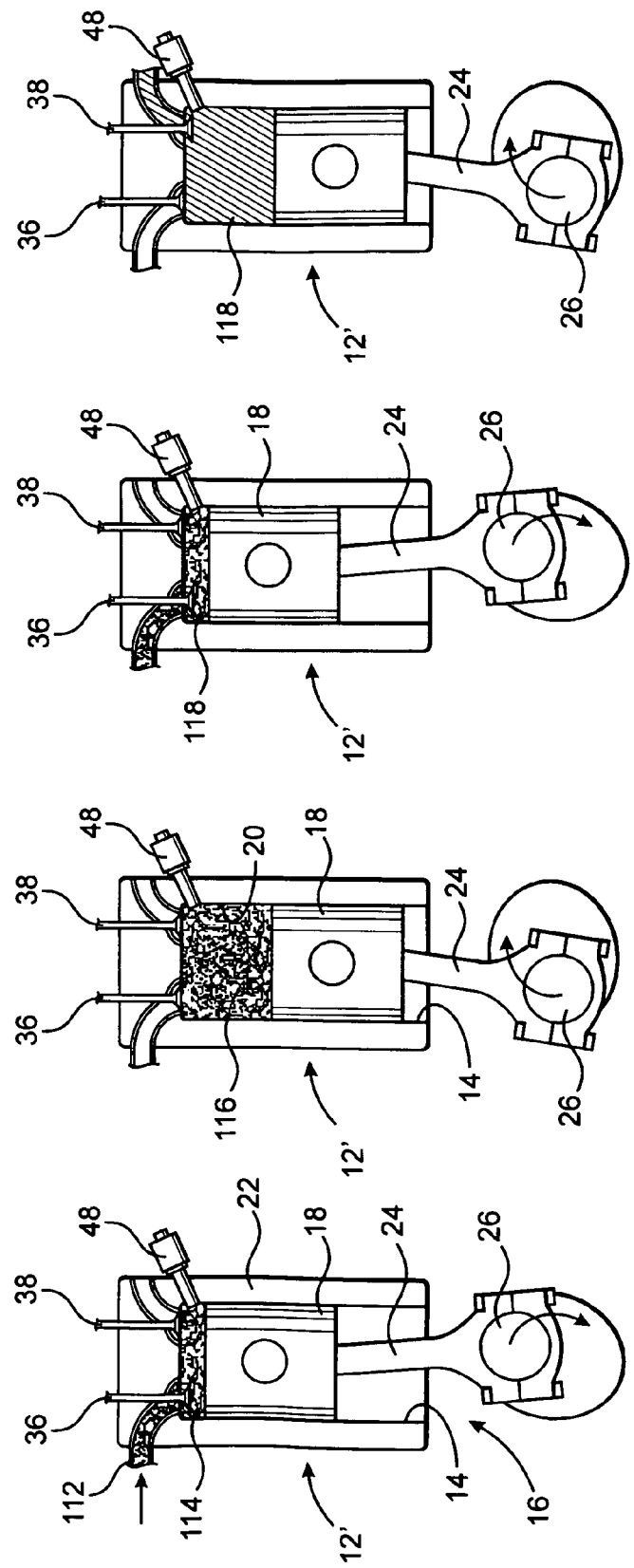
FIG. 4A through 4D consecutively represent successive strokes of a multi-stroke cycle of a piston and cylinder assembly incorporated within one of the alternative power sources of the power generating assembly of the embodiment of FIG. 3.

As practically applied and as also schematically represented in FIGS. 5 and 6, the resulting work energy or power delivered to the electrical system 230 and/or 232 may be used to drive or power a hybrid drive-train 234 or associated operative components of a hybrid drive assembly such as, but not limited to structural and operative features of the type disclosed in the embodiment of FIG. 3, set forth above. However, implementing the system 200 or 200' of the embodiments of FIGS. 5 and 6 would eliminate or significantly reduce the need for utilization of a generator 106, based on the generation of sufficient work energy or power by the conversion assembly and/or turbine 206, as set forth herein.

With primary reference to FIG. 6, a structural and operational variation of the system 200 is schematically represented therein, wherein the modified system represents yet another preferred embodiment of the present invention and is generally indicated as 200'. The system 200' is similar in structure and operation to the system 200 schematically represented in FIG. 5. One operational and structural distinguishing feature is associated with the second temperature variant zone 214'. Moreover, the second temperature variant zone 214' eliminates the need of a second heat exchanger 226 and instead serves to accomplish a significant increase in the temperature, and therefore the pressure and volume of the fluid flow 216' by introducing the exhaust gases, as at 242 directly into and with the fluid flow 216'. Exposure of the fluid flow 216' as it leaves the first heat exchanger 224 to a significantly increased temperature of the exhaust gases, as at 242, will further serve to increase the pressure and volume of the fluid flow 216', as set forth above. In order to further facilitate effective and efficient operation of the introduction of the exhaust gases from the second heat source 220 into the fluid flow 216' along the path of fluid flow 202, the exhaust gases are preferably first compressed using a secondary compressor assembly 240. Compression of the exhaust gases by the secondary compressor 240 will overcome any resistance to the entry thereof, as at 242, by the pressurized fluid flow 216', thereby further facilitating the direct exposure or mixture of the exhaust gases 242 with the fluid flow 216'.

In accordance with these most preferred embodiments of the present invention, the operation of the system 200 and a structural and operational variation thereof as at 200' will be described. As indicated above, air or other appropriate fluid enters the system 200, 200' at inlet 204, where the air may be ambient air from a source exterior to the IC engine 208 and/or system 200, 200'. A compressor assembly 210 is disposed in receiving, communicating relation with the incoming air or fluid and is structured to reduce the volume thereof at an increased pressure as the fluid flow 216 passes from the compressor assembly 210 to the first temperature variant zone 212. The increase in the temperature of the fluid flow 216 is accomplished by a heat exchange between the circulating cooling water or other cooling, fluid associated with the cooling system and representing the first heat source 218. This heat transfer results in an increased temperature, pressure and/or volume as the fluid flow 216' passes through and exits the first temperature zone 212.

It should be noted that the cooling water or fluid passes from the first exchanger 224 at a significantly reduced temperature after heat transfer occurs between the cooling water and the fluid flow 216. Further, the cooling water or other fluid of the cooling system is sufficiently reduced in temperature to provide the required cooling effect to the IC engine 208, as it circulates back through the appropriate portions of the IC engine 208, as at 215, such as through the water jackets 12, as described with reference to the embodiment of FIG. 1.

As set forth above, the fluid flow 216 is initially heated by the cooling fluid representing the first heat source 218 associated with the low temperature heating zone of the first temperature variant zone 212. Thereafter, the initially heated fluid flow 216' is exposed to an additional increase in temperature by heat transfer of the hot exhaust gases, defining the second heat source 220, associated with the second temperature variant zone 214'. An increase in temperature, pressure and/or volume will result, such that air 216' passing along a portion the path of fluid flow, as at 202', has been processed to more effectively and efficiently operate the conversion assembly 206, preferably in the form a gas powered turbine.

Additional structural and operative features include a removal of the exhaust gas as at 235 from the second heat exchange assembly 226 of the embodiment of FIG. 5 after transferring latent heat therein to the gas flow 216'. The exhaust 235 may pass through the conventional exhaust system which may or may not include a variety of different types of environmental control devices as is well known in the automobile industry.

Upon reaching the conversion assembly or turbine 206, the greatly expanded fluid flow 216' effectively and efficiently drives the turbine 206 resulting in the generation or production of work energy or power in sufficient quantities to power or drive auxiliary components and/or a hybrid drive assembly 234. As also set forth above, the hybrid drive assembly 234 may include appropriate electrical power and/or drive components including an alternator 230 and/or battery assembly 232 as well as other operative components associated with a hybrid drive assembly of the type set forth above in detail.

Subsequent to the exhaust gases driving the conversion assembly or turbine 206, sufficient heat will be lost so as to exit or exhaust the remaining exhaust gases as at 235'. The gases as at 235' may be further exhausted using a conventional or customized exhaust system as described with reference to the expulsion of the exhaust gases 235 leaving the second heat exchanger 226.

The structural and operational features of the system modification 200' is similar with the exception, as noted above, of the direct introduction of the hot exhaust gases 242 from the second heat source 220, derived from IC engine 208, being mixed with or directly exposed to the fluid flow 216' by entering the path of fluid flow 202 rather than passing through the aforementioned and described second heat exchanger 226 associated with the structural variation and modification of the system 200 as schematically represented in FIG. 5.

Additional structural and operative features of each of the modifications of the system 200 and 200' include the air compressor assembly 210 being driven by the IC engine 208 rather than by any external or supplementary power source. Such driving interconnection between the IC engine 208 and the compressor assembly 210 can be accomplished by appropriate mechanical, drive linkage 250. As an appropriate and efficient practical consideration, the air compressor assembly 210 may be added to the operation of a vehicle by the removal of a conventional radiator fan assembly normally provided in association with the mounting of an IC engine for purposes of cooling the cooling water or circulating cooling fluid associated with the cooling system. As such, the first heat exchanger 224 will eliminate the need for a radiator assembly since the heat exchange process between the circulating water or like fluid defining the first heat source 218 will result in a sufficient reduction in the temperature of the cooling water or cooling fluid as at 215. The required cooling effect of the IC engine 208 can be accomplished by re-circulating the reduced temperature cooling fluid 215 through the water jackets 22 associated with the various cylinders 12 of the IC engine 208 as described in detail with reference to the embodiment of FIG. 1. Appropriate pump facilities, as at 56 (FIG. 1) may also be provided in order to accomplish efficient circulatory flow of the cooling water or fluid throughout its intended path of travel of the system 200 and 200'.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for recovering wasted energy from an internal combustion engine, said system comprising:
    a path of fluid gas flow extending between a fluid inlet and a conversion assembly, said path of fluid gas flow structured to direct fluid gas flow therebetween,
    a first temperature variant zone and a second temperature variant zone both disposed in communicating relation with said path of fluid gas flow and structured to vary the temperature of said fluid gas flow,
    said first and second temperature variant zones each respectively connected to a different first heat source and a second heat source, derived from the internal combustion engine, and
    said first heat source comprising a circulating cooling fluid associated with a cooling system of the internal combustion engine; said second heat source comprising exhaust gases associated with an exhaust system of the internal combustion engine, and
    said first and second temperature variant zones and said path of fluid gas flow cooperatively structured to facilitate an expanded volume of said fluid gas flow being directed along said path of gas flow to said conversion assembly.

2. A system as recited in claim 1 wherein said fluid gas flow comprises a flow of air, said fluid inlet disposed in fluid communication with air externally of said internal combustion engine.

3. A system as recited in claim 1 further comprising a compressor assembly disposed in fluid receiving relation to said fluid inlet and in communicating relation to said path of fluid gas flow upstream of said first and second temperature variant zones.

4. A system as recited in claim 3 wherein said compressor assembly is disposed and structured to establish a reduced volume of said fluid gas flow along at least a portion of said path of fluid gas flow.

5. A system as recited in claim 1 wherein said first temperature variant zone is disposed upstream of said second temperature variant zone along said path of fluid gas flow.

6. A system as recited in claim 5 wherein said first temperature variant zone comprises a low temperature heat exchange phase along said path of fluid gas flow.

7. A system as recited in claim 6 wherein said second temperature variant zone comprises a high temperature heat exchange phase along said path of fluid gas flow.

8. A system as recited in claim 1 wherein said conversion assembly is structured to convert said fluid gas flow into usable work energy.

9. A system as recited in claim 8 wherein said conversion assembly comprises a gas operated turbine assembly.

10. A system as recited in claim 8 wherein said conversion assembly is operatively connected to a power take-off assembly.

11. A system as recited in claim 10 wherein said power take-off assembly is operatively connected to hybrid drive assembly.

12. A system as recited in claim 1 wherein said first temperature variant zone comprises a first heat exchange assembly disposed in heat transferring relation to said fluid gas flow.

13. A system as recited in claim 12 wherein said first heat exchange assembly is connected to said first heat source derived from said internal combustion engine.

14. A system as recited in claim 13 wherein said second temperature variant zone comprises a secondary heat exchange assembly disposed in heat transferring relation to said fluid gas flow downstream of said first temperature variant zone.

15. A system as recited in claim 14 wherein said secondary heat exchange assembly is connected to said second heat source derived from said internal combustion engine.

16. A method of recovering wasted energy from an internal combustion engine comprising:
- directing a fluid gas along a path of fluid gas flow,
- subjecting the fluid gas along the path of gas flow to at least a first temperature variant zone and a second temperature variant zone both disposed in heat transferring relation to the fluid gas along the path of fluid gas flow,
- associating said first and second temperature variant zones respectively with different a first heat sources and a second heat source, derived from the internal combustion engine,
- defining the first heat source as a circulating cooling fluid associated with a cooling system of the internal combustion engine and directing the cooling fluid to the first temperature variant zone,
- defining the second heat source as exhaust gases of an exhaust system of the internal combustion engine and directing the exhaust gases to the second temperature variant zone,
- expanding the volume of the fluid gas directed along the path of gas flow by exposure to the first and second temperature variant zones, and
- converting the expanded volume of fluid gas to work energy.

17. A method as recited in claim 16 further comprising directing the exhaust gases into heat transferring relation to the fluid gas directed along the path of gas flow substantially on an exterior of the path of fluid gas flow.

18. A method as recited in claim 16 further comprising introducing the exhaust gases into the fluid gas directed along the path of gas flow within on an interior of the path of fluid gas flow.

19. A method as recited in claim 18 further comprising compressing the exhaust gases prior to introducing the exhaust gases into the fluid within gas on the interior of the path of fluid gas flow.

20. A method as recited in claim 19 further comprising compressing the fluid gas being directed along the path of gas flow substantially prior to its introduction into the path of fluid gas flow.

21. A method as recited in claim 16 further comprising compressing the fluid gas being directed along the path of gas flow substantially prior to its introduction into the path of fluid gas flow.

22. A method as recited in claim 21 comprising defining the fluid gas introduced into the path of fluid flow as air.

23. A method as recited in claim 16 comprising defining the fluid gas introduced into the path of fluid gas flow as ambient air.

24. A system for recovering wasted energy from an internal combustion engine, said system comprising:
- a path of gas flow extending between a fluid inlet and a conversion assembly, said path of gas flow structured to direct gas flow therebetween,
- a first temperature variant zone and a second temperature variant zone both disposed in communicating relation with said path of gas flow and structured to vary the temperature of said gas flow,
- said first and second temperature variant zones respectively connected to a first heat source and a second heat source,
- said first heat source comprising a circulating cooling fluid associated with a cooling system of the internal combustion engine;
- said first temperature variant zone comprising a heat exchange assembly disposed in heat transferring relation to said gas flow; said heat exchange assembly connected to said circulating cooling fluid associated with the cooling system of the internal combustion engine,
- said second heat source comprising exhaust gases associated with an exhaust system of the internal combustion engine; said exhaust gases introduced into said gas directed along said path of gas flow, and
- said first and second temperature variant zones and said path of gas flow cooperatively structured to facilitate an expanded volume of said gas flow being directed along said path of gas flow to said conversion assembly.

25. A system as recited in claim 24 wherein said fluid inlet is disposed and structured to introduce air as said fluid gas passing along said path of fluid gas flow.

26. A system as recited in claim 25 further comprising a compressor assembly connected in driven relation to the internal combustion engine and disposed in fluid receiving relation to said fluid inlet and in communicating relation to said path of fluid gas flow upstream of said first and second temperature variant zones.

* * * * *